(12) United States Patent
Follette et al.

(10) Patent No.: US 7,531,026 B2
(45) Date of Patent: May 12, 2009

(54) DEAERATION DEVICE AND METHOD OF USE

(75) Inventors: David J. Follette, San Diego, CA (US); Kevin T. Stone, San Diego, CA (US)

(73) Assignee: ISE Corporation, Poway, CA (US)

( * ) Notice: Subject to any disclaimer, the term of this patent is extended or adjusted under 35 U.S.C. 154(b) by 386 days.

(21) Appl. No.: 11/559,082

(22) Filed: Nov. 13, 2006

(65) Prior Publication Data

US 2008/0110344 A1 May 15, 2008

(51) Int. Cl.
*B01D 19/00* (2006.01)

(52) U.S. Cl. ............... 95/262; 95/243; 96/204; 96/220; 123/41.54; 165/104.32

(58) Field of Classification Search .......... 95/262, 95/260, 242, 243, 259, 241; 96/204, 206, 96/220, 180, 176; 123/41.54; 210/172.2; 165/104.32; 220/563

See application file for complete search history.

(56) References Cited

U.S. PATENT DOCUMENTS

| | | | |
|---|---|---|---|
| 2,713,973 A | 7/1955 | Hencken et al. | |
| 3,195,294 A * | 7/1965 | Verdura et al. | 96/220 |
| 3,604,502 A | 9/1971 | Morse | |
| 4,098,328 A | 7/1978 | Cheong | |
| 4,624,687 A | 11/1986 | Pere | |
| 5,085,677 A | 2/1992 | Ville et al. | |
| 5,329,889 A | 7/1994 | Caldwell | |
| 5,680,833 A | 10/1997 | Smith | |
| 5,970,928 A | 10/1999 | Smietanski et al. | |
| 6,216,646 B1 | 4/2001 | Smith et al. | |
| 7,244,293 B2 * | 7/2007 | Morita et al. | 96/204 |
| 2002/0007736 A1 | 1/2002 | Hearn et al. | |
| 2005/0081716 A1 * | 4/2005 | Morita et al. | 95/241 |

\* cited by examiner

*Primary Examiner*—Duane Smith
*Assistant Examiner*—Douglas J Theisen
(74) *Attorney, Agent, or Firm*—Stephen C. Beuerle; Procopio Cory Hargreaves & Savitch LLP

(57) ABSTRACT

A deaeration device for deaerating coolant fluid flow in a recirculation cooling system, where the recirculation cooling system includes a cooling fluid reservoir adapted to receive the deaeration device submerged within cooling fluid therein, includes an elongated deaeration tube including a fluid outlet and a deaerating skimming shaped slot for skimming air bubbles and cooling fluid from cooling fluid flow flowing through the deaeration tube, and including a fluid inlet for allowing the same amount of fluid that is skimmed off and removed through the top fluid outlet to re-enter the deaeration tube to maintain mass balance in the cooling fluid flow.

14 Claims, 4 Drawing Sheets

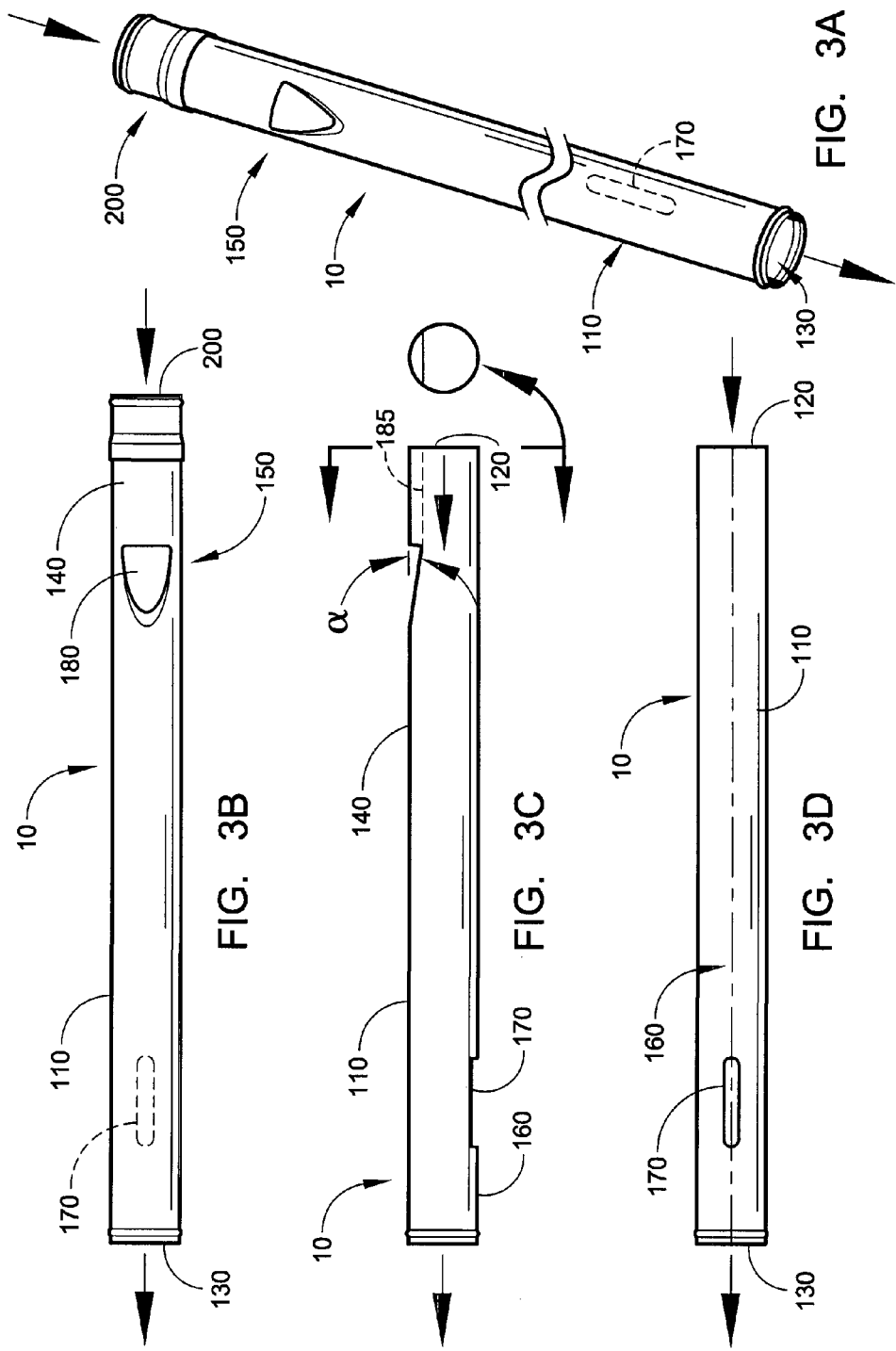

DEAERATION DEVICE AND METHOD OF USE

FIELD OF THE INVENTION

The field of the invention relates to deaeration devices for removing air bubbles from liquid flow that has air bubbles in the fluid flow.

BACKGROUND OF THE INVENTION

When air bubbles exist in the fluid medium for any kind of heat transfer application, they can potentially attach themselves to any surface and act as an insulator, preventing heat transfer between the fluid medium and the heated and cooled surfaces. In a transportation application, this exists in the radiators cores and other components in the cooling loop. By way of example but not limitation, in a hybrid-electric drive system this includes engine radiators, engine, heater core, electric motors, generators, braking resistors, and inverters. Any surface that transfers heat into or out from the cooling fluid will suffer a performance reduction if air bubbles are present in the fluid.

SUMMARY OF THE INVENTION

An aspect of the present invention involves a deaeration device that utilizes the principle that bubbles will more readily escape from a slow moving fluid flow or stationary pool rather than a fast moving fluid flow, and that in a closed flow loop, the same fluid will circulate around the loop multiple times in a relatively short period of time. The deaeration device includes a hollow tube with two cutouts, integrated into a reservoir, where the tube is submerged in the reservoir fluid. The first cutout is at an angle, and has an attached plate that effectively "skims" or "strips" off part of the fluid flow from the top of the tube. This top layer of the fluid flow will tend to have more bubbles, since air tends to rise to the surface, but this design is still effective if the bubbles are uniformly mixed into the flow. The second cutout in the tube is at the other end, and on the bottom side. This cutout is designed to allow deaerated fluid in the reservoir to reenter the tube to replace the fluid that was lost through the first cutout. The two openings are placed at opposite ends of tube to allow the maximum time for the "skimmed" fluid to release its air bubbles before re-entering the flow. The deaeration device provides continuous deaeration without substantially affecting the flow. Although the deaeration tube does not deaerate the full flow all at once; with a recirculation system, such as an automotive coolant loop, the fluid will pass through the tube numerous times; and over time, all of the fluid will have had the opportunity to slow down and release its air bubbles.

Allowing the fluid to slow down, and then reaccelerating it to the flow speed requires energy. By limiting the amount of fluid that slows down at one time, this invention reduces the energy required for deaeration. This reduces the load on the pump, without reducing the effectiveness of the system. In addition, once the system is fully deaerated, the pumping loss remains at its low level, since only a fraction of the flow continues to be diverted.

Another aspect of the invention involves a deaeration device for deaerating coolant fluid flow in a recirculation cooling system, the recirculation cooling system including a cooling fluid reservoir adapted to receive the deaeration device submerged within cooling fluid therein. The deaeration device includes an elongated deaeration tube and a deaerating skimming shaped slot fluid outlet for skimming air bubbles and cooling fluid from cooling fluid flow flowing through the deaeration tube, and a fluid inlet for allowing the same amount of fluid that is skimmed off and removed through the fluid outlet to re-enter the deaeration tube to maintain mass balance in the cooling fluid flow.

A further aspect of the invention involves a method of deaerating cooling fluid flow in a recirculation cooling system, the recirculation cooling system including a cooling fluid reservoir and a deaeration device submerged within cooling fluid, the deaeration device including an elongated deaeration tube having an incoming flow end where cooling fluid flows into the deaeration tube, an outgoing flow end where cooling flow flows out of the deaeration tube, including a fluid outlet and a deaerating skimming shaped slot, and a fluid inlet. The method includes receiving fluid flow through the incoming flow end of the deaeration tube; skimming air bubbles and cooling fluid from the cooling fluid flow through the deaeration tube with the deaerating skimming shaped slot so that the skimmed off air bubbles and cooling fluid enter cooling fluid in the cooling fluid reservoir; receiving the same amount of cooling fluid that is skimmed off and removed through the fluid outlet into the deaeration tube through the fluid inlet to maintain mass balance in the cooling fluid flow; and expelling the cooling fluid flow out of the outgoing flow end.

BRIEF DESCRIPTION OF THE DRAWINGS

The accompanying drawings, which are incorporated in and form a part of this specification, illustrate embodiments of the invention and together with the description, serve to explain the principles of this invention.

FIG. 3A is a top perspective view of the deaeration device of FIG. 1A;

FIG. 3B is a top plan view of the deaeration device of FIG. 1A;

FIG. 3C is a side elevational view of the deaeration device of FIG. 1A;

FIG. 3D is a bottom plan view of the deaeration device of FIG. 1A.

DETAILED DESCRIPTION OF A PREFERRED EMBODIMENT

Figure 1:
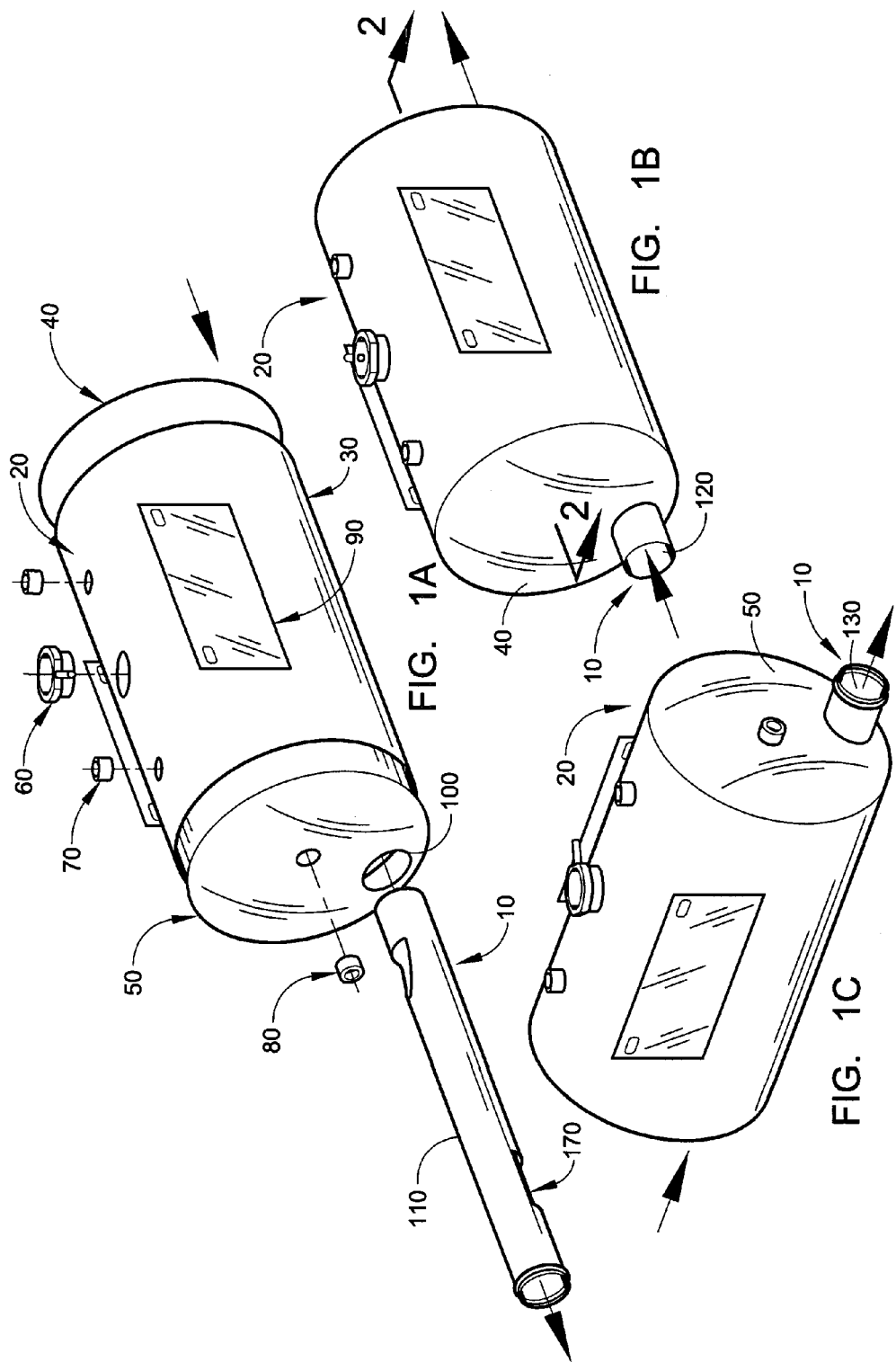
FIG. 1A is a front exploded perspective view of a liquid reservoir including an embodiment of a deaeration device.
FIG. 1B is a rear perspective view of the liquid reservoir and deaeration device of FIG. 1A.
FIG. 1C is a front perspective view of the liquid reservoir and deaeration device of FIG. 1A.
Figure 2:
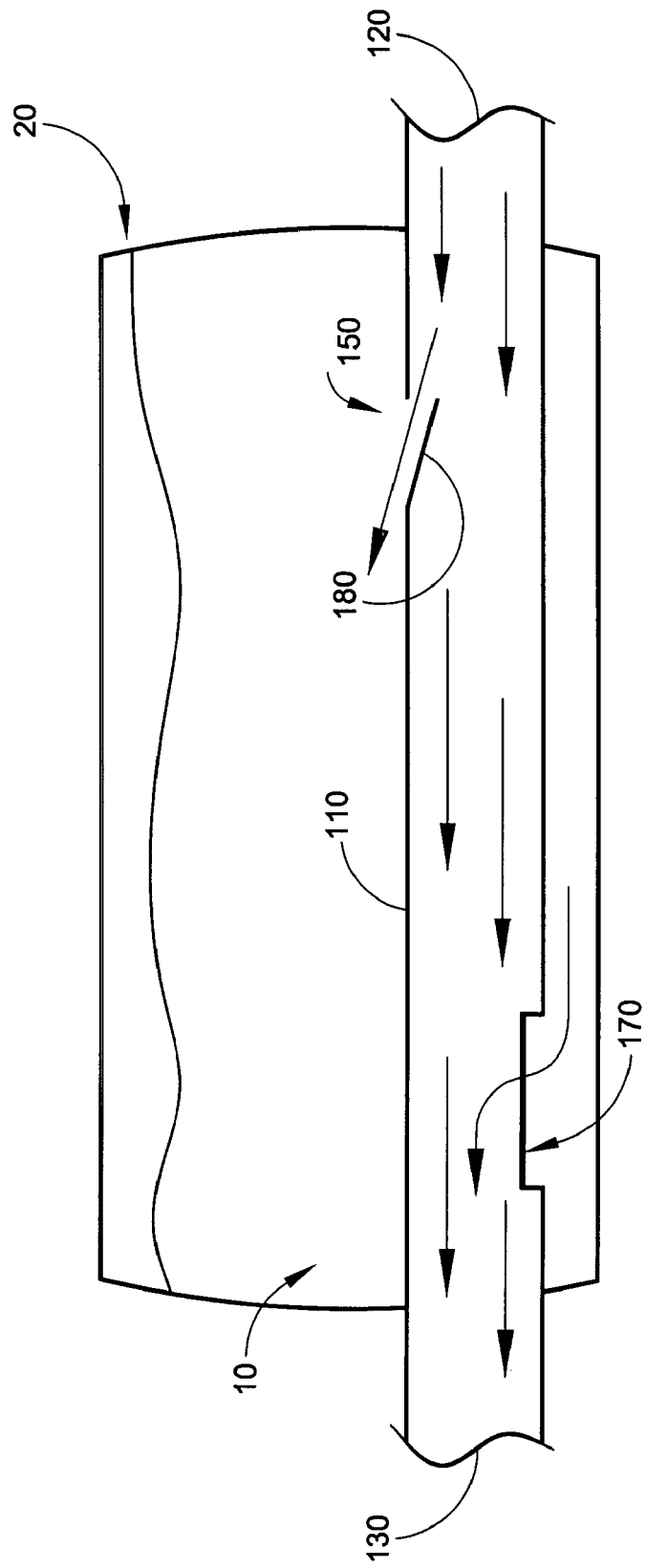
FIG. 2 is a cross-sectional view taken along lines 2-2 of FIG. 1B.
Figure 4B:
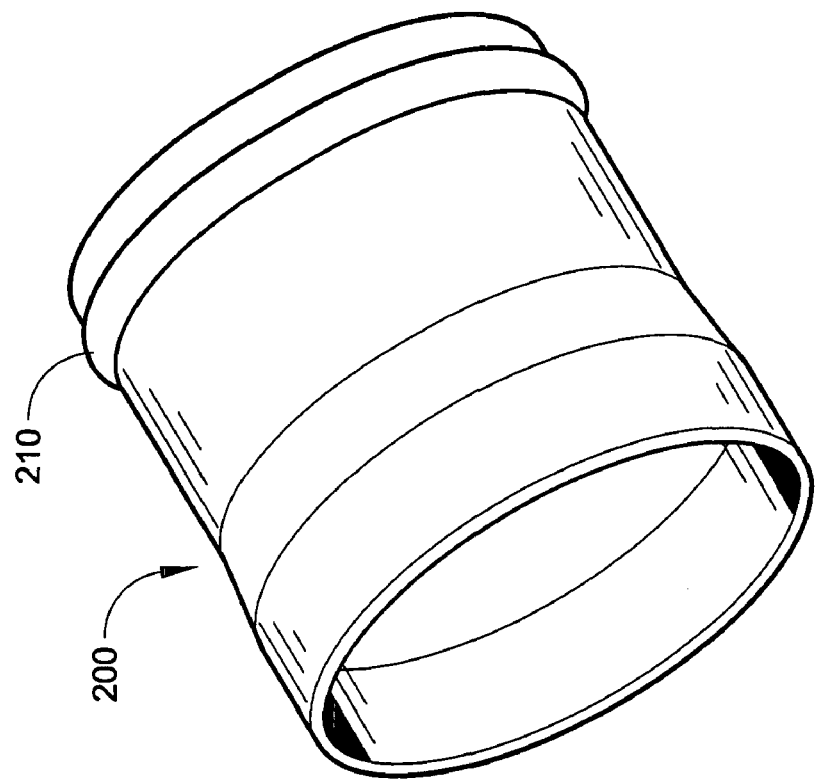
FIG. 4B is a perspective of a hose mounting bead cap for the deaeration device of FIGS. 3A, 3B, 3C, and 3D.
Figure 4A:
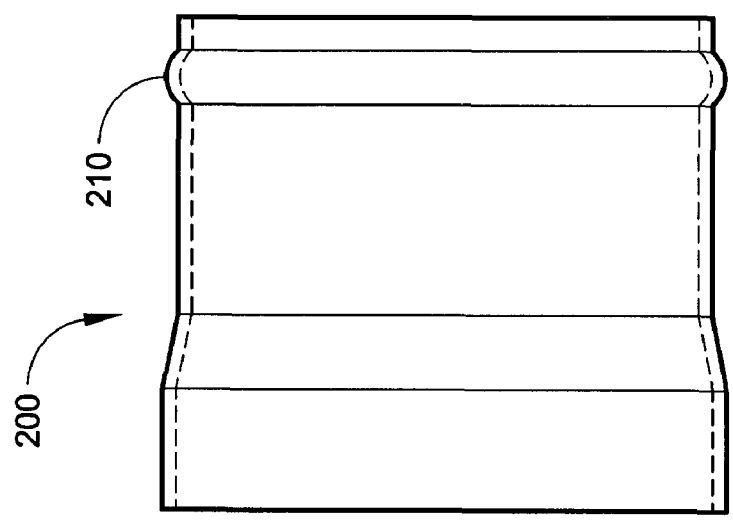
FIG. 4A is a side elevational view of a hose mounting bead cap for the deaeration device of FIGS. 3A, 3B, 3C, and 3D.

With reference to FIGS. 1-3, an embodiment of a deaeration device 10 for a coolant reservoir 20 of a hybrid transit bus cooling package for both engine and electronics cooling loops will be described. More particularly, the deaeration device has continuous deaerating capabilities and is part of a complete rooftop cooling package for a hybrid transit bus. Although the deaeration device 10 is described in conjunction with deaerating a cooling fluid, the deaeration device 10 may be used in other applications other than deaerating a cooling fluid, for example, but not by way of limitation, in an alternative embodiment, the deaeration device 10 is used for deaerating liquid fuel in a fuel line/system. Still further, the deaeration device 10 may be used in coolant reservoirs other than those of a hybrid transit bus cooling package and/or in cooling loops in addition to or other than engine and electronics cooling loops.

In the embodiment of the deaeration device 10 and the reservoir 20 illustrated in FIGS. 1A-1C, the reservoir 20 includes a cylindrical body 30, circular front end cap 50, circular rear end cap 40, aluminum filler neck 60, half couplings 70, 80, and reservoir mount flanges 90. The end caps 40, 50 include circular holes 100 therein to receive the deaeration device 10. The portion of the deaeration device 10 within the closed reservoir 20 is submerged in cooling fluid in the reservoir 20.

With reference additionally to FIGS. 1-4, the deaeration device 10 includes an elongated cylindrical deaeration pipe or tube 110 with opposite open ends 120, 130 for coupling communication with the coolant loop. End 120 is an incoming flow end and end 130 is an outgoing flow end. End 130 also has a hose mounting bead formed into the tube to allow it to be attached to a flexible hose, typical of automotive coolant applications. End 120 is left without a bead so it can be passed through the hole 100 in end cap 50 and a similar hole (not shown) in the other end cap 40 during assembly before being welded into place. If end 120 also had a hose bead, it would require the hole 100 in end cap 50 and the hole (not shown) in the other end cap 40 to be larger in diameter to accommodate the bead during assembly. Without a hose bead, end 120 has a smaller diameter and allows the tube to fit more tightly in the holes prior to welding. After the tube is welded into place, an additional cap 200, with a tube bead 210, is welded to end 120 such that it can provide the bead mounting for a flexible hose. A top 140 of the deaeration tube 110 includes a top fluid outlet 150 adjacent the incoming flow end 120 and a bottom 160 of the deaeration tube 110 includes a bottom fluid inlet 170 adjacent the outgoing flow end 130. The top outlet 150 has a deaerating skimming shaped slot in the form of an attached substantially triangular deaeration plate 180 that is declined relative to the top 130 at an angle α to effectively "skim" or "strip" off the top layer of the fluid flow. With reference to FIG. 3C, the angle α and the length of the triangular deaeration plate 180 determines the depth dimension 185. The crossectional area of the tube 110 above the dimension line 185 divided by the total crossectional area of the tube 110 determines the percentage of the tube 110 flow that is diverted for deaeration. This top layer of the fluid flow will tend to have more bubbles since air tends to rise to the surface, but this design is still effective if the bubbles are uniformly mixed into the flow. The bottom inlet 170 in the deaeration tube 110 has a narrow elongated configuration and is designed to allow deaerated fluid in the reservoir 20 to reenter the deaeration tube 110 to replace the fluid that was lost through the top outlet 150.

In use, recirculated cooling fluid flows through the cooling loop and through the deaeration device 10 in the reservoir 20. The deaeration device 10 deaerates the cooling fluid while limiting flow energy loss compared to deaerating devices of the past. The deaeration device 10 takes advantage of the principle of bubbles naturally escaping from slow moving flow, the fact that bubbles will tend to rise to the surface/top of the flow, and, that in a closed flow loop (e.g., recirculating cooling loop), the same fluid will pass through multiple times in a relatively short period of time.

Cooling fluid flows into incoming flow end 120 of the deaeration tube 110. The deaeration plate 180 that effectively "skims" or "strips" off the top bubble layer of the fluid flow. The remaining fluid in the deaeration tube 110 flows past the deaeration plate 180, towards the outgoing flow end 130. The bottom inlet 170 allows deaerated fluid in the reservoir 20 to reenter the tube 110 to replace the fluid that was lost through the first, top outlet 150. Because the deaeration tube 110 is inside a closed reservoir, the amount of fluid that is "skimmed off" will have to re-enter the tube 110 in the bottom inlet 170 to maintain mass balance.

The deaeration device 10 provides continuous deaeration without substantially affecting the flow. Although the deaeration tube 110 does not deaerate the full flow at once, with a recirculating system, such as an automotive coolant loop, the fluid will pass through the tube 110 numerous times, and over time, all of the fluid has the opportunity to slow down and release its air bubbles. Allowing the fluid to slow, and then reaccelerating it to the flow speed requires energy. By limiting the amount of fluid that slows down at one time, this deaeration device 10 reduces the energy required for deaeration. This reduces the load on the pump, without reducing the effectiveness of the cooling fluid flow system. In addition, once the cooling fluid flow system is fully deaerated, the pumping loss remains at its low level, since only a fraction of the flow continues to be diverted.

In alternative embodiments of the deaeration device 10, the dimensions/configurations of the cutouts 150, 170, locations of the cutouts 150, 170, numbers of cutouts 150, 170, and/or configuration/angle of the deaeration plate 180 are varied relative to that shown in FIGS. 1-3. For example, the angle α at which the "skimming" opening or outlet 150 attacks the flow can be changed. The angle α at which the "skimming" opening or outlet 150 attacks the flow is independent of the size of the opening. In one or more embodiments of the invention, the angle α of attack of the "skimming" plate is anything greater than 0 degrees. The more shallow the angle α of attack, the more gradual the change in speed of the flow will be. There may be advantages to quickly slowing the flow, but a shallow angle α of attack prevents the exiting flow from breaking the surface of the cooling fluid and causing bubbles. The exiting flow causes the flow in the reservoir 20 to move somewhat, but since there is a large volume in the reservoir 20 that is not moving, the resulting flow is very slow relative to the flow in the tube 110.

The depth 185 of the "skimming" opening or outlet 150 can be altered to change the volume of flow that is diverted through the reservoir. The change in the size of the opening is a tradeoff between energy loss in the flow and speed of deaeration. The larger the opening, the more quickly the flow deaerates, but the greater the energy loss in the flow.

The size and shape of the inlet opening 170 is chosen to maintain the mass flow balance as determined by the outlet opening 150 without otherwise affecting the fluid flow. Thus, the area of the inlet opening 170 is about the same or slightly larger than the area of the outlet opening 150 as determined by cutout dimension 185. The general, oval shape of the inlet opening 170 was selected for ease of cutting the opening 170 in the deaeration tube 110 during manufacture of the deaeration device 10. Without affecting the specification of this invention, alternative embodiments of the inlet opening have different shaped inlet openings 170 with similar open areas to the internal flow of the deaeration tube.

While the deaeration device 10 is described above with an efficient orientation and spacing of a top fluid outlet 150 and a bottom fluid inlet 170 located on the bottom 160 of the deaeration tube 110, in other alternative embodiments various orientations and spacings of the outlet and inlet cutouts also serve to deaerate bubbles from the flowing fluid, albeit somewhat less efficiently.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A deaeration device for deaerating coolant fluid flow in a recirculation cooling system, the recirculation cooling system including a cooling fluid reservoir adapted to receive the deaeration device submerged within cooling fluid therein, comprising: an elongated deaeration tube and a deaerating skimming shaped slot fluid outlet for skimming air bubbles and cooling fluid from cooling fluid flow flowing through the deaeration tube, and a fluid inlet for allowing the same amount of fluid that is skimmed off and removed through the fluid outlet to re-enter the deaeration tube to maintain mass balance in the cooling fluid flow.

2. The deaeration device of claim 1, wherein the deaeration tube includes a top and a bottom, the top of the elongated deaeration tube including a top fluid outlet and the bottom including a fluid inlet.

3. The deaeration device of claim 1, wherein the deaeration tube includes an incoming flow end where cooling fluid flows into the deaeration tube and an outgoing flow end where cooling flow flows out of the deaeration tube, and the fluid outlet is adjacent the incoming flow end and the fluid inlet is adjacent the outgoing flow end.

4. The deaeration device of claim 1, wherein the deaerating skimming mechanism includes a deaeration plate declined at an angle relative to the outside diameter surface of the deaeration tube, and the angle is greater than zero degrees.

5. The deaeration device of claim 4, wherein the deaeration plate has a substantially triangular configuration.

6. The deaeration device of claim 1, wherein the deaeration device is part of a hybrid transit bus cooling package for both engine and electronics cooling loops.

7. The deaeration device of claim 1, wherein the deaeration device is part of a complete rooftop cooling package for a hybrid transit bus.

8. A method of deaerating cooling fluid flow in a recirculation cooling system, the recirculation cooling system including a cooling fluid reservoir and a deaeration device submerged within cooling fluid, the deaeration device including an elongated deaeration tube having an incoming flow end where cooling fluid flows into the deaeration tube, an outgoing flow end where cooling flow flows out of the deaeration tube, including a fluid outlet and a deaerating skimming shaped slot, and a fluid inlet, comprising:

receiving fluid flow through the incoming flow end of the deaeration tube;

skimming air bubbles and cooling fluid from the cooling fluid flow through the deaeration tube with the deaerating skimming shaped slot so that the skimmed off air bubbles and cooling fluid enter cooling fluid in the cooling fluid reservoir;

receiving the same amount of cooling fluid that is skimmed off and removed through the fluid outlet into the deaeration tube through the fluid inlet to maintain mass balance in the cooling fluid flow; and expelling the cooling fluid flow out of the outgoing flow end.

9. The method of claim 8, wherein the deaeration tube includes a top and a bottom, the top of the elongated deaeration tube including a top fluid outlet and the bottom including a fluid inlet.

10. The method of claim 8, wherein the fluid outlet is adjacent the incoming flow end and the fluid inlet is adjacent the outgoing flow end.

11. The method of claim 8, wherein the deaerating skimming shaped slot includes a deaeration plate declined at an angle relative to the outside diameter surface of the deaeration tube, and the angle is greater than zero degrees.

12. The method of claim 11, wherein the deaeration plate has a substantially triangular configuration.

13. The method of claim 8, wherein the deaeration device is part of a hybrid transit bus cooling package for both engine and electronics cooling loops.

14. The method of claim 8, wherein the deaeration device is part of a complete rooftop cooling package for a hybrid transit bus.

* * * * *